United States Patent Office 3,533,221
Patented Oct. 13, 1970

3,533,221
OXYGEN CONCENTRATION PROCESS
Takaaki Tamura, 6–814 Toyama-Haitsu, 1 Toyama-cho,
Shinjuku-ku, Tokyo, Japan
Filed Dec. 26, 1968, Ser. No. 786,888
Claims priority, application Japan, Dec. 27, 1967,
43/83,284
Int. Cl. B01d 53/02
U.S. Cl. 55—33                                8 Claims

ABSTRACT OF THE DISCLOSURE

High purity oxygen is recovered from air by a process which comprises adsorbing moisture and carbon dioxide in a first column and then adsorbing the nitrogen in a second column. The columns are then regenerated by a desorption step.

---

The present invention is concerned with an improved process for increasing the oxygen content of air and more particularly, the present invention is concerned with a process of obtaining high-pure oxygen using an adsorbent from ordinary air, that is, the air from which moisture, carbon dioxide, etc., have not been removed by pre-treatment (hereinafter, such air is called "ordinary air" in this specification).

As gas separation means, there have hitherto been proposed various processes wherein a readily adsorbed gas component is separated from a less readily adsorbed gas component using an adsorbent by repeating an adsorption step and a desorption step (cf., e.g., Japanese Pats. 14,529/1960 and 25,969/1963 and U.S. Pats. 2,944,-627 and 3,164,454).

These processes are very profitable since they require no heating means and no cooling means and also when such an adsorption process is applied to the recovery of high-pure oxygen or high-pure nitrogen from air, a vast electrical power and a large installation investment are not required as in air liquefaction systems. Accordingly, various attempts have been proposed for industrial purposes.

However, in a conventional process of recovering high-purity oxygen from air by such an adsorption process, an adsorbent usually employed in such a process looses its adsorption power for nitrogen by adsorbing moisture and carbon dioxide contained in air as impurities. Therefore, such impurities must first be removed from the air before the air is introduced to the adsorption system, which requires additional installations. Also the operation of such additional installation requires considerable trouble.

Thus, an object of the present invention is to provide a process for recovering high-purity oxygen from ordinary air using an adsorbent without necessity of additional means for first removing moisture and carbon dioxide from the air.

Other object of the present invention is to provide a process for recovering high-purity oxygen by an adsorption system from ordinary air while simultaneously removing simultaneous moisture and carbon dioxide by simple and inexpensive means.

Still other object of this invention is to provide an industrial process for recovering high-purity oxygen (that is, containing a very small proportion of nitrogen) of a grade capable of being utilized for industrial purposes from ordinary air in situ without necessary of additional specific installations for first removing the aforesaid impurities from the air.

These and still other objects of this invention can be achieved by the process of this invention, which will be explained below in detail.

Figure 1:
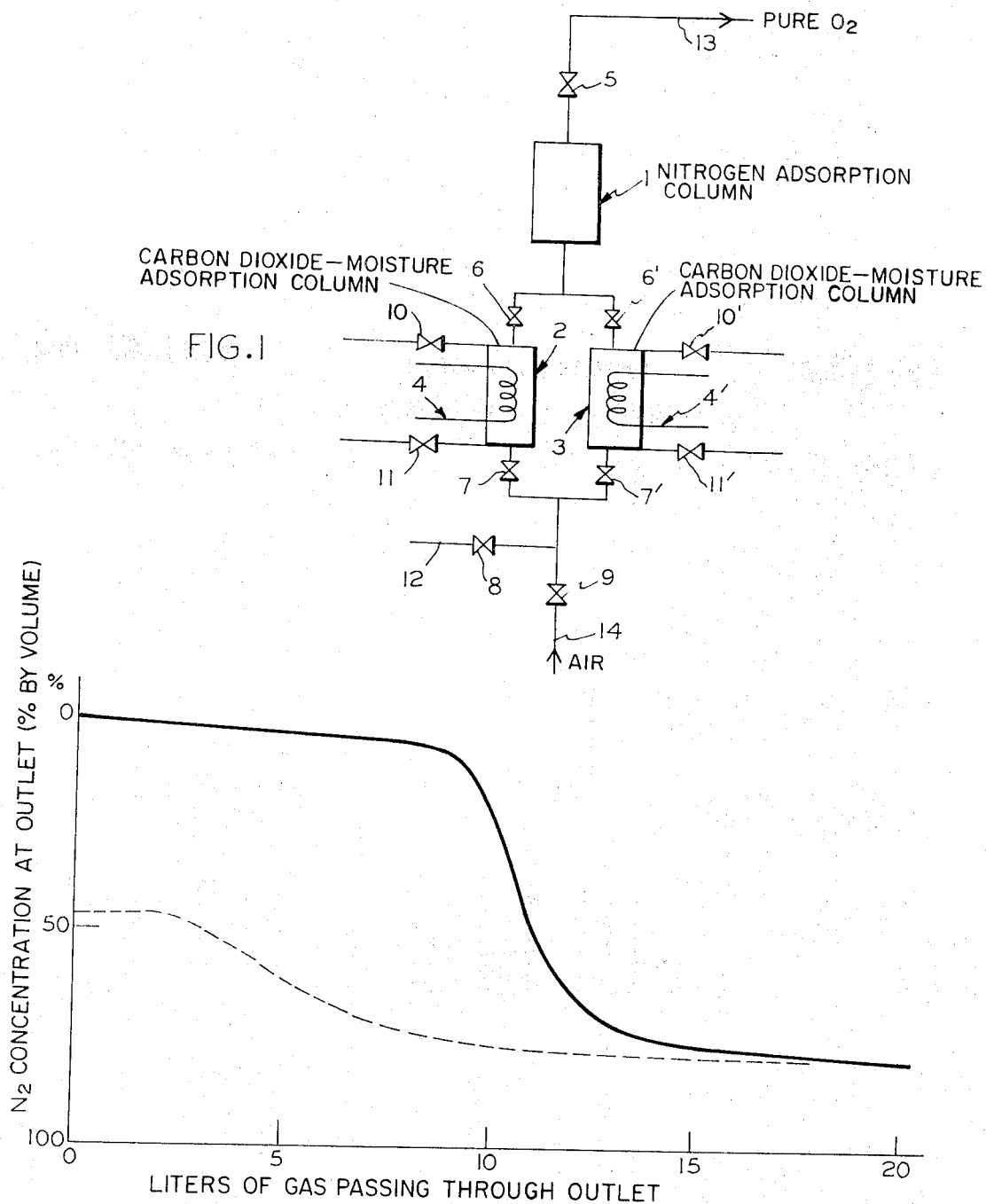
Figure 2:
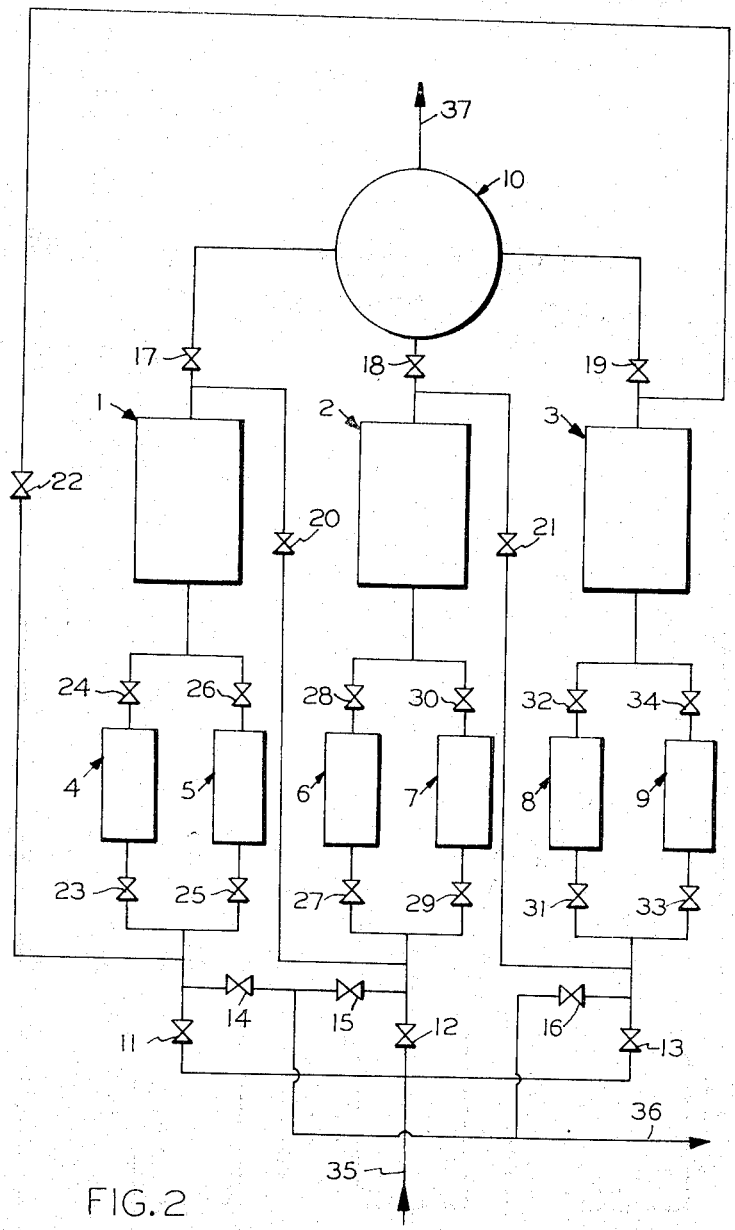

The invention will first be described by referring to the accompanying drawings, in which FIG. 1 is a schematic view showing the principle of the present invention;

FIG. 2 is a schematic view showing a practical embodiment of operating the process of this invention; and FIG. 3 is a graph showing the relation between the nitrogen gas content in the gas at the outlet and the amount of the gas passed through the outlet in the system shown in FIG. 1.

Now, referring to FIG. 1, the oxygen concentration system of the present invention comprises a nitrogen adsorption column 1 for separating oxygen and two adsorption columns 2 and 3 for removing moisture and carbon dioxide from air to be treated (hereinafter, such adsorption column for removing the impurities is called "pre-treatment column"). In nitrogen adsorption column 1 is packed an adsorbent having a high selective adsorption power for nitrogen, such as, Molecular Sieve 5 A. or 13×. Further, for obtaining very high-pure oxygen, it is preferable to employ a specific adsorbent which will be explained later in detail. The adsorbent used in pre-treatment columns 2 and 3 may be same as that used in the adsorption column 1 but there may be employed an adsorbent which can adsorb moisture and carbon dioxide, such as, silica gel and alumina.

The pre-treatment columns 2 and 3 are equipped with heating means 4 and 4' respectively, whereby the inside of the columns can be heated if necessary. As the heating means may be employed an electric heater or a heat-exchange coil through which a heating gas or a heating liquid is circulated. Furthermore, instead of employing the heating means 4 and 4', a hot gas such as air may be passed through the pre-treatment column via valves 10 and 10' and conduits when heating of the pre-treatment column is required.

The operation of the adsorption system shown in FIG. 1 will be explained in the case of using the pre-treatment column 2 at first.

Since the components adsorbed on the adsorbent packed in the adsorption column 1 and the pre-treatment column 2 must be desorbed or removed at the beginning of the operation, the valves 5, 9, 10, 11, 6' and 7' are closed, the valves 6, 7, and 8 are opened, and the column 1 and column 2 are evacuated through a conduit 12 by means of a vacuum pump (not shown), whereby the components adsorbed on the adsorbents and the inside space of the columns are desorbed and exhausted (hereinafter, this procedure is called "desorption step or procedure"). The pressure for the evacuation is suitably ½ to $\frac{1}{100}$ atm. according to the purity of oxygen to be recovered. In this case, the purity of oxygen recovered is higher as the pressure for evacuation is lower.

After the components adsorbed on the adsorbents and the space of the columns are removed sufficiently, the valve 8 is closed, the valve 5 is opened, and thereafter dry high-pure oxygen is introduced to the system from a suitable pure oxygen source (not shown) (hereinafter, the procedure is called "feedback step or procedure"). The pure oxygen for the feedback step is supplied from a separately prepared oxygen source but from the next step, the pure oxygen prepared by the process of this invention may be utilized for the feedback procedure. The pressure of oxygen to be supplied for the feedback procedure depends on the case where the adsorption procedure is conducted by selecting a normal pressure as the standard or a high pressure as the standard. That is, in the case where the adsorption procedure is carried out by selecting a normal pressure as standard, the pure oxygen is introduced into the system until the pressure of the oxygen in the system reaches almost atmospheric pressure, while in the case where a high pressure is selected as the standard, the oxygen is introduced until the pressure in the system reaches almost the high pressure.

After the feedback procedure is finished, the valve 9 is opened, ordinary air, that is, the air from which moisture and carbon dioxide have not been removed is introduced through a conduit 14, and at the same time the pure oxygen used for the feedback procedure as mentioned above and pure oxygen separated from the introduced air by the adsorption system are recovered through a conduit 13 (this procedure is called "adsorption step or procedure"). In the adsorption step, moisture and carbon dioxide in the air introduced are first removed in the pre-treatment column 2 by the adsorbent therein and nitrogen in the air is adsorbed by the adsorbent in the adsorption column 1. In other words, when ordinary air is passed through the system in the adsorption process, the concentration of nitrogen in the gas at the outlet of the adsorption column 1 is substantially the same as that of the pure oxygen gas used for the feedback step even after the pure oxygen gas used for the feedback step was recovered for a period of time but when the adsorption procedure is further continued over a period, the concentration of nitrogen in the gas at the outlet is suddenly increased and it reaches that of air soon. (Hereinafter, the above-mentioned point is called "break through point" and the curve showing the relation between the amount of the gas passed through the outlet of the column and the concentration of nitrogen in the gas at the outlet is called "break through curve".) Therefore, if the product gas containing a low content of nitrogen is required, the valves 9 and 5 are closed just before the break through point, while if the amount of oxygen is required in one cycle of adsorption procedure (that is, the yield for oxygen is required to be increased) although the concentration of nitrogen in the gas recovered may be increased to some extent, the valves 9 and 5 are closed after the break through point is completely passed and the concentration of nitrogen in the gas at the outlet reaches almost that of air.

As mentioned above, when only one adsorption column for adsorbing nitrogen is employed as in the system shown in FIG. 1 and an oxygen-rich gas containing a low concentration of nitrogen is desired, the oxygen-rich gas containing an intermediate concentration of nitrogen passing through the outlet of the adsorption column from just before the break through point to the end of the break through point si lost but this demerit is avoided by using two or more adsorption columns as shown in FIG. 1 in series temporarily, the embodiment of which will be explained later in respect of the embodiment shown in FIG. 2, wherein three adsorption columns are utilized.

The detection of the aforesaid break through point may be conducted by measuring the concentration of nitrogen in the gas at or near the outlet of the adsorption column by means of a suitable gas analyser, etc., and also it may be conducted by utilizing the phenomenon that heat is generated by the adsorption of nitrogen on an adsorbent, that is, by detecting the abrupt temperature raise at the break through point by means of a thermocouple or a thermistor. Furthermore, if a period of time from the introduction of air into the adsorption system to the break through point in the adsorption step is found preliminary by tests under a definite condition, the system can be operated by setting a proper period of time for the operation of valves without measuring the concentration of nitrogen in the gas or the temperature of the gas. The location for detecting the break through point of the gas passing through the adsorption column may be the end of the gas outlet of the adsorption column but may be a position slightly apart from the end of the gas outlet to the gas inlet side of the adsorption column. In particular, the latter is desirable if it is required to know what the gas composition at the outlet end is just before the break through point, which will be explained later in detail in respect of the embodiment shown in FIG. 2.

As described above, the adsorption procedure is terminated by closing the valves 9 and 5. In the adsorption step, since nitrogen is a main component in air to be used as the raw material and also an adsorbent ordinarily employed has an extremely high adsorption power for moisture and carbon dioxide as compared with that for nitrogen, the adsorption power of the adsorbent in the adsorption column 1 for nitrogen reaches its saturation before pre-treatment column 2 is saturated by moisture or carbon dioxide if the capacity of the pre-treatment column is not extremely small. In other words, if the amount of the adsorbent in the column 2 is selected to be larger than that of the adsorbent in the column 1 by a definite value, moisture and carbon dioxide in the air supplied to the adsorption system are adsorbed in the pre-treatment column 2 and will not enter the column 1 when ordinary air is introduced into the system until nitrogen point appears at the outlet end of the column 1.

Thereafter, the valve 8 was opened and the valve 5 is closed to conduct the desorption procedure and then, after closing the valve 8 and opening the valve 5, the feedback procedure is carried out by introducing through a conduit 13 a part of the oxygen-rich gas recovered in the previous step to the system, and the aforesaid procedures are repeated.

When the above-mentioned procedures are repeated for a long period of time, moisture and carbon dioxide are accumulated in the pre-treatment column 2 to lose finally the adsorption power of the adsorbent in said column. Such a state can be determined by means of a carbon dioxide detector or a moisture detector placed at or near the outlet end of the column 2 at adsorption step. Also, the presence of moisture can be more easily detected by placing silica gel colored blue with cobalt chloride near the outlet end of the column 2 and observing the discoloration of the silica gel to rose-color by moisture.

When moisture or carbon dioxide begins to be detected at the outlet end of the pre-treatment column 2, the valves 6 and 7 are closed, the valves 6' and 7' are opened, and valves 10' and 11' are closed, and the aforesaid procedures are repeated continuously by employing another pre-treatment column 3. During the operation of the system employing the pre-treatment column 3, the pre-treatment column 2 the adsorbent in which has lost its adsorption power by the accumulation therein of moisture and carbon dioxide is subjected to the following regeneration procedure. That is, while heating the inside of the column 2 by means of the aforesaid heating device, the valves 10 and 11 are opened and ordinary air is passed through the column 2 through the conduits, whereby the moisture and the carbon dioxide adsorbed on the adsorbent are desorbed and removed at a high temperature under normal pressure. Since the heating procedure is conducted by heating only the column 2 and ordinary air is only used as a carrier gas to remove out the moisture and the carbon dioxide from the column, that is, without using the air from which moisture and carbon dioxides have not removed, the costs for installations and heating are low. After the regeneration of the adsorbent in the pre-treatment column 2 is finished, the column 2 is allowed to cool for reuse in the subsequent step. The column 2 may be cooled by passing a cooling medium through the coil 4. The heating temperature for the regeneration of the adsorbent depends upon the kind of adsorbent but is usually about 150 to about 600° C.

The principle of the present invention was explained via the embodiment of using two columns as the pre-treatment columns but only one pre-treatment column may be employed when the recovery of oxygen is stopped during the regeneration of the pre-treatment column by heating or a fresh adsorbent is supplied continuously or intermittently to the pre-treatment column in an air-tight state and simultaneously the degraded adsorbent is withdrawn from the column. In these cases, particularly, in the latter case, the valves 6 and 6' as shown in FIG. 1 may be considered to be unnecessary but for the below stated reason, it is necessary in relation to the case of stopping the operation that valve (as valve 6 or 6' in FIG. 1) be provided between the nitrogen adsorbing column and the pretreatment column.

The aforesaid process provides excellent results as shown in the example of this invention. That is, the air to be introduced as the raw material for recovering oxygen can be introduced into the adsorption system without being pre-treated as in conventional manner and also in spite of using ordinary air, the column 2 is saturated by moisture and carbon dioxide after a longer period of time. Furthermore, for regenerating the column 2 thus saturated, pre-dried air is unnecessary, that is, the column 2 and the column 3 are exchanged for each other when one of them is saturated by moisture and carbon dioxide an the column may be regenerated by passing therethrough ordinary air while heating the column. Also, the purity of oxygen recovered by the adsorption system is high as well as the yield for oxygen is high.

The reasons why the process of this invention produces the aforesaid excellent results are not accurately clear but are considered to be based mainly on the following points.

The first reason is in the desorption step. That is, when the aforesaid desorption procedure is conducted, the gas desorbed consists mainly of the gas desorbed from the adsorbent in the adsorption column 1, which mainly consists of, as a matter of course, nitrogen (90–98% of nitrogen), and the gas contains neither moisture nor carbon dioxide.

Since the desorption procedure of the present invention is conducted by evacuating the system while closing the valves 5, 9, 10, 11, 6', and 7', the desorbed gas passes through the pre-treatment column 2 (or 3) at a decreasing pressure and is sucked by a vacuum pump through the valve 8 and the conduit 12 to the direction opposite to the direction of introducing ordinary air at the adsorption step. Therefore, the moisture and the carbon dioxide adsorbed on the adsorbent positioned near the air inlet end of the column 2 (or 3) are purged partially by the stream of the highly dried nitrogen-rich gas from the adsorption column and sucked away by means of the vacuum pump. This is supported, as clear from the below examples by, the fact that the increase of the weight of the column 2 (or 3) during continuing the operation is markedly lower than the weight of moisture and carbon dioxide carried by the air introduced into the system during the operation. In other words, in Example 1, 20.0 cubic meters of ordinary air containing 12.7 g./m.$^3$ of moisture and 0.55 g./m.$^3$ of carbon dioxide was introduced into the adsorption system and hence if the whole moisture and carbon dioxide in the air were adsorbed by the adsorbent in the column 2 (or 3), the weight of the column would be increased by about 265 g. but the actual weight increase was only 6.0 g. Further, no increase of weight was observed about the adsorption column 1 as will be stated in Example 1, which indicates neither moisture nor carbon dioxide having been adsorbed in the column 1. This means that even if a large volume of ordinary air is introduced into the adsorption system of this invention, the adsorption column 1 is completely prevented from being reduced in adsorption power by the adsorption of moisture and carbon dioxide by only packing a small amount of adsorbent in the pre-treatment column 2 (or 3) in the process of this invention. In the process of this invention, the pre-treatment column saturated with moisture and carbon dioxide must be regenerated by passing air through it under heating but since the amount of the adsorbent packed in the pre-treatment column is small, the power necessary for heating the adsorbent may be small, which makes the economical value of the process very high.

The second reason is in the feedback step. That is, in the process of this invention, as mentioned above in detail, ordinary air is not introduced into the system directly after the desorption procedure by evacuation but is introduced after introducing into the system pure oxygen or the oxygen-rich product gas preliminary until the pressure in the system reaches almost the same pressure for the adsorption procedure. It is clear from Example 1, Example 2, and FIG. 3 showing the results in these examples that the break through curve of nitrogen at the outlet end of the adsorption column 1 is very sharp by the application of the feedback procedure as compared with the case of omitting the feedback procedure. Thus, the product having a high concentration of oxygen can be obtained with a high yield. Furthermore, since in the feedback procedure, the feedback gas is introduced through the conduit to the pre-treatment column 2 (or 3) in the direction opposite to that of ordinary air in the adsorption procedure and also as the feed back gas, a part of the product gas containing neither moisture nor carbon dioxide is utilized, the adsorbed zone of moisture and carbon dioxide shifted near the inlet end of the pre-treatment column 2 (or 3) by the desorption procedure being further shifted to the inlet end thereof by the feedback gas, which increases remarkably the adsorption capacity of the pre-treatment column 2 (or 3).

The principle of the present invention as well as the excellent results thereof and the reasons of providing such results as mentioned above will become further clear by comparing Examples 1, 2, and 3. That is, upon comparing Example 1 with Example 2, it will be clear that by the application of the feedback procedure, the yield for oxygen per unit operation can be increased by using an adsorbent having the same adsorption power (see FIG. 3) and the necessary number of regenerations of the pre-treatment columns for every unit of reduced oxygen) can be reduced and also upon comparing Example 1 with Example 3 wherein a conventional two-column exchange system was employed in regard to only the step of removing moisture and carbon dioxide, the heat required for regenerating the pre-treatment column in the process of this invention is only $\frac{1}{83}$ of the conventional system in the case of employing a same adsorbent in both systems, which shows the excellent advantage of the process of this invention as compared with the conventional system for removing moisture and carbon dioxide.

In the above embodiment, there were explained the merits of repeating the three steps of desorption, feedback and adsorption in this order according to the process of this invention but it will be understood that if the concentration of oxygen in the product gas may not be required to be high, the feedback procedure may be omitted in the process of this invention.

That is, when the two steps of desorption and adsorption is conducted using the adsorption system as shown in FIG. 1 in the same manner as the steps of desorption and adsorption in the above-mentioned three steps, the concentration of nitrogen in the product gas is high and is not constant as well as the yield for oxygen to air introduced is lowered as shown in Example 2. However, on comparing the case of Example 2 with a conventional system consisting of a simple combination of a conventional two-column exchange system for removing moisture and carbon dioxide and a conventional adsorption system, it will be understood that the process of this invention shown in Example 2 is more economical than the conventional system. In this case, when a set of the pre-treatment columns is employed and the desorption step and the adsorption step are conducted alternately, the product gas can be recovered continuously.

The merits of the process of this invention described above, were based on the case of employing only one adsorption column 1 as shown in FIG. 1, but such a simple system is somewhat insufficient in for industrial application in the following points:

(1) By employing only one adsorption column 1 as in FIG. 1, the product gas cannot be recovered continuously in a long run and hence the operations of the air supply pump and the evacuation pump or vacuum pump become intermittent.

(2) As stated above in relation to the adsorption procedure, in the case of recovering highly concentrated oxygen, the oxygen-rich gas containing an intermediate concentration of nitrogen obtained from just before the break through point to the finish of the break through point is lost.

The aforesaid drawback (2) is prevented by employing two adsorption systems as shown in FIG. 1.

That is, when the break through point appears at the outlet end of the first adsorption column, the oxygen-rich gas having an intermediate concentration of nitrogen recovered thereafter is introduced to the air inlet of the second adsorption system wherein the desorption and the feedback procedures have first been completed and when the composition of the gas at the outlet end of the first adsorption column reaches the composition of air (finish of break through point), the supply of air to the first adsorption system is terminated and air is, then, immediately introduced into the second adsorption system. Thereafter, the first adsorption system is immediately subjected to the desorption and feedback procedures. Also, when the break through point of nitrogen appears in the gas passing the outlet end of the second adsorption column, the oxygen-rich gas having an intermediate concentration of nitrogen recovered from the break through point to the finish of the break through point is introduced into the air inlet of the first adsorption system which have been subjected to the desorption and feedback procedures as stated above. Thereafter, when the composition of the gas passing the outlet end of the nitrogen adsorption column in the second adsorption system reaches the composition of air, the supply of ordinary air to the second adsorption system is stopped and the air is immediately supplied to the first adsorption system. These operations are, thereafter, repeated.

Such an improved operation as stated above can be easily practiced by providing proper conduits and valves but the aforesaid fault (1) is not removed. That is, the above-mentioned faults (1) and (2) can be removed by employing at least three adsorption systems as shown in FIG. 1. Thus, the preferred embodiment of the present invention will be explained by referring to FIG. 2.

In FIG. 2, three adsorption systems as shown in FIG. 1 are combined as shown in FIG. 2. Thus, the numerals 1, 2, and 3 indicate nitrogen adsorption columns corresponding to the nitrogen adsorption column 1 in FIG. 1 and the numerals 4, 5, 6, 7, 8, and 9 indicate the pre-treatment columns corresponding to the pre-treatment columns 2 and 3 in FIG. 1. Each pre-treatment column in FIG. 2 also equipped with a heating device and conduits for purging moisture and carbon dioxide saturated in the column at the regeneration (corresponding to the heating means 4 or 4′ and conduits 10 and 11 or 10′ or 11′) but they are all not shown in FIG. 2 for simplicity in drawing.

An air inlet pipe 35 is connected to an air-supply means (not shown). A conduit 36 is connected to an evacuation pump or vacuum (not shown) for evacuating the system at the desorption step. A constant pressure dry gas holder 10 for dry product gas is connected to three nitrogen adsorption columns 1, 2, and 3 through valves 17, 18, and 19 respectively and also connected to a product withdrawing pipe 37. The valves from 11 to 22 are used for each step of desorption, feedback, and adsorption and the valves from 23 to 34 are used when each of the pre-treatment columns from 4 to 9 is required to be regenerated by heating. The adsorbents to be packed in the columns 1–9 are the same as in the embodiment shown in FIG. 1. Furthermore, the procedure for the regeneration of the pre-treatment columns 4–9 and the time for regenerating them are same as in the embodiment shown in FIG. 1.

Now, the operation of the embodiment shown in FIG. 2 will be stated below in the case of operating the pre-treatment columns 4, 6, and 8 (accordingly, the valves 23, 24, 27, 28, 31, and 32 are opened and the valves 25, 26, 29, 30, 33, and 34 are closed).

First of all, dry oxygen having a high purity is charged into the gas holder 10. Then, after opening the valves 14 and 15 (other valves are closed except the valves 23, 24, 27, 28, 31, and 32 as mentioned above). The system comprising the adsorption column 1 and the pre-treatment column 4 as well as the system of the adsorption column 2 and the pre-treatment column 6 are evacuated to an extent corresponding to the purity of oxygen desired. Then, by closing the valves 14 and 15 and opening the valves 17 and 18, the feedback procedures for both adsorption systems are executed by the introduction of oxygen from gas holder 10. Thereafter, by operating the valves 11–22 in the order shown in Table 1, the system of the column 1 and column 4, the system of columns 2 and 4, and the system of the columns 3 and 8 each is employed from the first cycle to the 6th cycle shown in Table 1 while repeating the steps of desorption, feedback, and adsorption in this order to continuously provide oxygen-rich gas.

TABLE 1

| (A) | (B) | State of valves | | | | | | | | | | | |
|---|---|---|---|---|---|---|---|---|---|---|---|---|---|
| | | 22 | 20 | 21 | 11 | 12 | 13 | 17 | 18 | 19 | 14 | 15 | 16 |
| No. 1 | 1 ad.→(a)<br>2 fb<br>3 de | − | − | − | + | − | − | + | + | − | − | − | + |
| No. 2 | 1 (a)→(b)<br>2 ad.<br>3 de | − | + | − | + | − | − | − | + | − | − | − | + |
| No. 3 | 1 de<br>2 ad.→(a)<br>3 fb | − | − | − | − | + | − | − | + | + | + | − | − |
| No. 4 | 1 de<br>2 (a)→(b)<br>3 ad. | − | − | + | − | + | − | − | − | + | + | − | − |
| No. 5 | 1 fb<br>2 de<br>3 ad.→(a) | − | − | − | − | − | + | + | − | + | − | + | − |
| No. 6 | 1 ad.<br>2 de<br>3 (a)→(b) | + | − | − | − | − | + | + | − | − | − | + | − |

Wherein (A) is operation cycle; (B) is operation states of three columns 1, 2, and 3 in each cycle; (ad.) is adsorption step; (fb.) is feedback state; (de.) is desorption step; (a) is the state just before break through point; (b) is the state of the finish of the break through point; (+) shows the state where the valve is opened, and (−) shows the state where the valve is closed.

When the adsorption power of each adsorbent, the rate of adsorption, the adsorption pressure, the adsorption temperature, and the supplying rate of air are constant, the exchange of each cycle may be conducted with almost definite time intervals and hence if the relation of the gas temperature at the outlet ends of the adsorption columns 1, 2 and 3 and the time of appearing the break through point in each gas at the outlet end of the column is first determined by experiments, the system may be exchanged to the next cycle with a constant period of time but it is most preferable, especially when the aforesaid conditions are not constant or the supplying rate of air is not constant that suitable detecting means for the break through point be placed in a proper position for each adsorption column as stated above in explaining the operation of the system shown in FIG. 1. The system is exchanged with the subsequent cycle according to the information from the detecting means at a given time, as stated below. That is, when the content of oxygen in the gas at the outlet ends of the adsorption columns 1, 2 and 3 each is decreased over a definite value, the first cycle may be exchanged with the second cycle, the 3rd cycle may be exchanged with the 4th cycle, or the 5th cycle may be exchanged with the 6th cycle in Table 1. On the other hand, the exchange of the 2nd cycle with the 3rd cycle, 4th cycle with the 5th cycle, or 6th cycle with the 1st cycle in Table 1 may be conducted when the composition of the gas at the outlet ends of the adsorption columns 1, 2 and 3 reaches the composition of air.

As detectors for the above purpose, there are considered various kinds thereof, various operation manners, various positions, and numbers. For example, by placing one oxygen analyzer in each outlet end of the adsorption columns 1, 2 and 3, when the concentration of oxygen in the gas at the outlet end of the column becomes less than a definite value, the exchange of the 1st cycle with the 2nd cycle, 3rd cycle with the 4th cycle, and the 5th cycle with the 6th cycle in Table 1 are immediately conducted, while when the concentration of the gas at the outlet end reaches that in air, the exchanges of the 2nd cycle with the 3rd cycle, the 4th cycle with the 5th cycle, and the 6th cycle with the 1st cycle in Table 1 are immediately conducted. However, by such a manner, two different concentrations of oxygen must be measured and a slight deviation of the oxygen concentration must be detected rapidly. Therefore, the operation of the system is troubled by the delay in detection, the deviation of the absolute value of the detection for oxygen concentration, and the deficiency in sensitivity of the detector.

Thus, one of more desirable manners will be explained below. That is, two oxygen concentration detectors are placed in each of the adsorption columns 1, 2 and 3. In each column, one of the detectors is placed in the absorbent in the column at a position near the outlet of air located a suitable distance from the inlet end, while another detector is placed in the adsorbent at the position near the outlet end of the column. By employing such a system for the detection of oxygen concentration, the following advantages are obtained.

This will be explained about column 1. If the oxygen detector is placed near the gas outlet end of the column 1 located a suitable distance from the inlet as mentioned above, the system can be so established that when the adsorption in the adsorption column 1 (the 1st cycle in Table 1) approaches the end and just before the break through point of nitrogen passes through the gas outlet end of the column 1, the detector placed in the column 1 near the outlet end thereof is already in the break through point. Therefore, the detector shows a most remarkable change in oxygen concentration at this time and hence even if an inexpensive detector having an insufficient sensitivity is employed, the exchange time for the adsorption system can be rapidly and accurately detected. By observing the detector, the 1st cycle of the system is exchanged to the 2nd cycle in Table 1 wherein the valve 17 has been closed and the valve 20 has been opened. The gas stream enters through the column 6 into the adsorption column 2. At the time when the break through point is passed through the gas outlet of the column 1 during the 2nd cycle and the gas having the composition almost same as air begins to enter through the column 6 into the column 2, the detector can be so positioned that it is in the break through point of nitrogen at the time if the detector is placed near the inlet end of the column 2 within a proper distance therefrom. Therefore, as mentioned above, by the detector the exchange time can be rapidly and accurately detected and by observing the detector, the 2nd cycle is exchanged to the 3rd cycle in Table 1.

The preferred embodiment of this invention was explained above in the case of employing two detectors placed near the outlet of the column 1 and near the air inlet end of the column 2 respectively but this embodiment may be applied similarly to other adsorption systems or columns.

As mentioned above in detail, by employing the three-column system as shown in FIG. 2 and suitable detectors properly positioned in the adsorption columns, high-purity oxygen can be recovered, completely automatically if desired, with a high yield from ordinary air without being accompanied by the aforesaid drawbacks as in the case of employing a one-column system or two-column system.

The merits of the present invention were explained by referring to the adsorption systems shown in FIG. 1 and FIG. 2 and a further feature of the present invention that has never been obtained in conventional adsorption system for separating oxygen or nitrogen from air is accomplished by closing the valves 6 and 6' in FIG. 1 and the valves 24, 26, 28, 30, 32, and 34 in FIG. 2 when the operation of the system is terminated.

The advantages may not be considered so important at a glance but in fact it is very important practice. That is, the actions of the valves during the operation of the adsorption system are same as those mentioned before. Now, assuming that the operation of the adsorption system must be stopped for a while by some reason of, e.g., power failure. In such a case, the valves connecting the system to outside valves 5, 8, and 9 in FIG. 1 and valves 11–22 in FIG. 2 are all closed as a matter of course but it has been confirmed that such a method is still insufficient. That is, when the operation of the system is stopped in such a state, the nitrogen adsorption column is connected to the pre-treatment column by the valve 6 or 6' in FIG. 1 and the valve 24, 26, 28, 30, 32, or 34 in FIG. 2. However, as mentioned above, the pre-treatment column contains moisture and carbon dioxide gradually accumulated in the column during the operation, while the nitrogen adsorption column contains no such impurities. Therefore, if the operation of the adsorption system is stopped for a long period of time in such a state, the moisture and carbon dioxide adsorbed on the adsorbent in the pre-treating column will enter the nitrogen adsorption column until the partial pressure then in the adsorption column becomes same as that in the pre-treatment column, which reduces the adsorption power of the adsorbent in the nitrogen adsorption column. However, if the valves connecting the nitrogen adsorption columns to the pre-treatment columns are all closed when the operation of the system is stopped, the aforesaid fault can be avoided clearly.

As stated before, in the oxygen concentration process by adsorption of the present invention, an adsorbent having a high selective adsorption power for nitrogen may be packed in the nitrogen adsorption column and an adsorbent capable of adsorbing moisture and carbon dioxide in air may be packed in the pretreatment. As such an adsorbent to be packed in the nitrogen adsorption column, there may be employed Molecular Sieve 5 A. and 13× which are kinds of synthetic zeolites and as the adsorbent to be used in the pre-treatment column, there are usually employed a synthetic zeolite, alumina, and silica gel.

However, the inventors have found that by using the below showing materials as the adsorbent, oxygen having a higher purity can be obtained with a high yield.

More specifically, it is preferable to employ the adsorbents prepared by grinding into suitable grain sizes, a naturally occurring inorganic material consisting of a tuff mainly comprising $SiO_2$, $Al_2O_3$ and $H_2O$ and containing 1–10% by weight of oxides of alkali metals and alkaline earth metals and at the same time having the X-ray diffraction pattern as shown in Table 2 or Table 3 and then subjecting the ground material to dehydration treatment by heating to 350–700° C., in particular, 400–650° C.

TABLE 2

| Lattice distance, A. | Intensity, 10 I/I₀ | Lattice distance, A. | Intensity 10 I/I₀ |
|---|---|---|---|
| 13.9±0.1 | 2 | 3.23±0.03 | 6 |
| 9.1±0.1 | 4 | 3.10±0.03 | 0–1 |
| 6.6±0.1 | 4 | 2.90±0.03 | 3 |
| 6.5±0.1 | 2 | 2.85±0.03 | 0–2 |
| 6.1±0.1 | 2 | 2.71±0.03 | 1 |
| 5.83±0.05 | 2 | 2.58±0.03 | 1 |
| 4.55±0.05 | 2 | 2.53±0.03 | 2 |
| 4.30±0.10 | 0–5 | 2.49±0.03 | 0–4 |
| 4.26±0.10 | 0–2 | 2.47±0.03 | 0–3 |
| 4.08±0.10 | 0–4 | 2.45±0.03 | 0–2 |
| 4.05±0.10 | 0–6 | 2.04±0.03 | 2 |
| 4.01±0.05 | 7 | 1.96±0.03 | 1 |
| 3.85±0.03 | 2 | 1.88±0.03 | 1 |
| 3.81±0.10 | 0–4 | 1.82±0.02 | 1 |
| 3.77±0.05 | 1 | 1.82±0.02 | 0–2 |
| 3.48±0.03 | 10 | 1.79±0.02 | 1 |
| 3.40±0.03 | 5 | 1.53±0.02 | 1 |
| 3.35±0.10 | 0–8 | | |

TABLE 2

| Lattice distance, A. | Intensity, 10 I/I₀ | Lattice distance, A. | Intensity, 10 I/I₀ |
|---|---|---|---|
| 9.10±0.1 | 7 | 3.18±0.03 | 4 |
| 7.99±0.1 | 4 | 3.15±0.03 | 4 |
| 6.82±0.1 | 2 | 2.99±0.03 | 0–1 |
| 5.85±0.08 | 5 | 2.98±0.03 | 4 |
| 5.29±0.08 | 2 | 2.89±0.03 | 4 |
| 5.12±0.05 | 3 | 2.85±0.03 | 0–2 |
| 4.67±0.05 | 2 | 2.81±0.03 | 3 |
| 4.30±0.10 | 0–5 | 2.74±0.03 | 1 |
| 4.26±0.10 | 0–2 | 2.53±0.02 | 2 |
| 4.08±0.10 | 0–4 | 2.49±0.03 | 0–4 |
| 4.05±0.10 | 0–6 | 2.47±0.03 | 0–3 |
| 3.98±0.05 | 10 | 2.46±0.02 | 2 |
| 3.85±0.05 | 2 | 2.45±0.03 | 0–2 |
| 3.81±0.10 | 0–4 | 2.02±0.02 | 0.5 |
| 3.77±0.05 | 2 | 1.95±0.02 | 0.05 |
| 3.47±0.03 | 7 | 1.87±0.02 | 0.5 |
| 3.34±0.10 | 0–8 | 1.81±0.02 | 0–2 |
| 3.35±0.03 | 5 | 1.72±0.02 | 0.5 |
| 3.22±0.03 | | | |

The inorganic material having the X-ray diffraction pattern shown in Table 2 mainly occurs in Tohoku district and Chugoku district in Japan, while the inorganic material having the X-ray diffraction pattern shown in Table 3 mainly occurs in Tohoku district and Kyushu district in Japan.

Since the above-mentioned adsorbent can be prepared by the simple step using as the raw material, the rock occurring naturally in large amount, a large amount of the adsorbent can be obtained with a much lower cost than not only expensive synthetic zeolites but also other conventional adsorbents such as silica and alumina the adsorption power of the adsorbent for nitrogen is generally larger than that of Molecular Sieve 5 A. which has the highest adsorption power among the synthetic zeolites under the same temperature and pressure. In particular, the adsorption power of the adsorbent obtained from the tuff having the X-ray diffraction pattern shown in Table 2 has been found to be 2.5 times higher than that of Molecular Sieve 5 A. Moreover, it has been confirmed by experiments that the separation factor which is obtained by dividing the equilibrium ratio of nitrogen to oxygen in the adsorbent by the ratio in the gase is about 2.5 in conventional synthetic adsorbents, while that of some of the adsorbents prepared from the said aforesaid naturally occurring inorganic materials reaches 5. Furthermore, the adsorption power of the above adsorbents is severely degraded by adsorbing moisture or carbon dioxide and hence it is necessary to use air containing no such components in the case of employing such an adsorbent.

On the other hand, the aforesaid adsorbent has a strong dehydration power or carbon dioxide adsorption power. That is, by experiments, the dew point of ordinary air passed through a layer of the adsorbent having a suitable length is lower than $-70°$ C. and no trace of carbon dioxide was observed in the air. Furthermore, when the water-content of the adsorbent is higher than 6%, the adsorbent still has the power to adsorb moisture and carbon dioxide. Accordingly, the adsorbents described above are suitable as an adsorbent to be packed in the nitrogen adsorption column as well as in the pre-treatment column.

Thus, by using the new adsorbents of this invention, the proportion of oxygen produced by one adsorption operation can be increased and the purity of oxygen is high, which reduces the size of the whole apparatus Furthermore, the new desorbent can be obtained at low cost. Accordingly, the construction cost of the oxygen plant is remarkably reduced.

The practical embodiments of this invention are explained by the following examples.

EXAMPLE 1

The system shown in FIG. 1 was employed. The column 1 was having 5 cm. in inner diameter and 95 cm. in length and each of the pre-treatment columns 2 and 3 was one having 5 cm. in inner diameter and 10 cm. in length. Also, as the adsorbent, there was employed one obtained from a kind of tuff occurred in Chugoku district. The component of the tuff was 69.86% by weight $SiO_2$, 11.70% by weight $Al_2O_3$, 1.76% by weight $Fe_2O_3$, 1.72% by weight CaO, 2.94% by weight $Na_2O$, 1.79% by weight $K_2O$, 10.76% by weight $H_2O$, and a trace of MgO and the X-ray diffraction pattern of it was almost same as that shown in Table 2. The tuff was ground into particles of 5–10 mesh in grain size, the particles were heated for 1 hour to 600° C. while supplying sufficient air, and allowed to cool to room temperature in a closed state to provide an adsorbent, which was packed in each column. When the weights of the packed columns were measured after passing sufficient dry air through the columns, the weight of the adsorption column 1 was 1500.0 g. and the weights of the pre-treatment columns 2 and 3 were 160.1 g. and 162.0 g. respectively. Then, the system was operated under the following conditions using the adsorption column 1 and the pre-treatment column 2 while closing the valves 6' and 7' for the pre-treatment column 3.

That is, the desorption procedure was conducted by evacuating the system by means of a vacuum pump until the pressure in the columns became 80 mm. Hg. Then, in the feedback procedure, the valve 8 was closed, the valve 5 was opened, and dried pure oxygen was introduced into the columns until the pressure in the columns became 760 mm. Hg. The amount of oxygen introduced was 6.8 liters. In the subsequent adsorption procedure, the valve 9 was opened and ordinary air was introduced through the conduit 14 to the column 2 and the column 1 with a rate of 6.5 liter/min. The air introduced contained 12.7 g. of moisture and 0.55 g. of carbon dioxide per one cubic meter thereof. The curve showing the relation of the concentration of oxygen in the gas at the gas outlet end of the column 1 and the amount of the gas passed through the gas outlet during the adsorption operation was shown in FIG. 3 by the solid line. In the graph, the amount of the gas is shown in the abscissa by liter and the concentration of nitrogen in the gas is shown in the vertical axis by percent by volume.

When the amount of air introduced reached 16 liters, the concentration of oxygen in the gas at the gas outlet end of the column 1 became 20%, at which the adsorption procedure was stopped and exchanged to the desorption procedure. Thereafter, these procedures were repeated. In this case, however, oxygen used in the feedback procedure from the second cycle was the oxygen-rich gas obtained by the previous adsorption procedure. As the quantity of air supplied was increased, the weight of the column 1 increased gradually but the dew point of the gas to be introduced into the column 2 from the column 1 was from $-65°$ C. to $-70°$ C. and no carbon dioxide was observed therein. However, when the total amount of air introduced reached 20 cubic meters, a trace of $CO_2$ was observed in the gas at the outlet end of the column 2. At this point, the weight of the adsorbent in the column 1 was 1500.0 g. and that of the adsorbent in the column was 166.1 g. Thereafter, the use of the column 2 was stopped and while using the column 3 as the pre-treatment column, the above procedures were repeated.

The adsorbent in the column 2 was heated to 600° C. for one hour while introducing ordinary air and after allowing to cool to room temperature under a closed state and replacing the inside of the column with sufficiently dry air. The weight of the adsorbent became 160.0 g.

Also, when the total amount of air introduced reached 20 cubic meters, the column 3 became the same state as in the column 2 and hence when the regeneration was conducted, the weight of the adsorpent therein was 162.1 g.

Thus, the recovery of oxygen from ordinary air was repeated while detecting the break through point of carbon dioxide in the pre-treatment columns and repeating the use and generation of the pre-treatment columns 2 and 3 but the weight of the adsorbent in the column 1 was not increased and also the adsorption power for nitrogen was not reduced.

EXAMPLE 2

The same procedure as in Example 1 was repeated except that the feedback procedure by oxygen was omitted. In this case, the break through curve at the gas outlet end of the column 1 during the operation was shown in FIG. 3 by dotted line. The total amount of air introduced until the break through point of carbon dioxide appeared in the pre-treatment column was 2.5 cubic meters.

EXAMPLE 3

Using the same columns as the column 2 and the column 3 in Example 1 and the same adsorbent as in the same example, only the adsorption procedure was conducted under normal pressure. However, in this case, the column 1 was omitted. That is, ordinary air was continuously passed through the column 2 to withdraw the purified air and when trace of carbon dioxide appeared in the column, the adsorption procedure was exchanged from the column 2 to the column 3. In this case, the total amount of ordinary air which could be processed in the column until the break through point of carbon dioxide appeared was 0.24 cubic meter. In other words, the removal of moisture and carbon dioxide from air was impossible by using the column 2 or 3 without regeneration by heating the column after passing 0.24 cubic meter of ordinary air. When the purified air was desired, it was necessary to regenerate the absorbent by heating with each passing of 0.24 cubic meter of ordinary air.

EXAMPLE 4

The system shown in FIG. 2 was employed. The dimensions of the adsorption columns and the pre-treatment columns, and the kind and the amount of adsorbent packed in the columns were same as those employed in Example 1. The adsorption procedure was conducted at 1.5 atoms (absolute) and the desorption procedure was conducted at 0.19 atm. Also, oxygen for the feedback procedure was supplied at first from a oxygen source but after the second cycle, the oxygen-rich gas prepared by the adsorption procedure was utilized. Ordinary air was introduced continuously into the system at a rate of 10 liters at normal atm./min.

As the detector for the break through point was used a commercially available oxygen analyser and six such detectors were placed in the three adsorption columns 1, 2, and 3. That is, the sensitive tips of two analysers were placed in each of the adsorbent columns each having a length of 94 cm. with a distance of 23 cm. from the inlet end and from the outlet end of the column respectively. Each of the detectors was set such that when the concentration of oxygen became below 30%, the system was exchanged to the subsequent cycle. The adsorption procedures were conducted while automatically exchanging the valves 11–22 as stated the embodiment shown in FIG. 2 by referring to Table 1. The valves 23–24 were operated by hands. The operation of the valves was conducted as in Example 1 by detecting the break through point of carbon dioxide at the outlet ends of the pre-treatment columns.

When 40 cubic meters of ordinary air containing 12.0 g. of moisture and 0.55 g. of carbon dioxide per cubic meter were introduced at the adsorption procedure, the existence of $CO_2$ was slightly detected at the gas outlet of the pre-treatment column.

When the production of an oxygen-rich gas containing about 80% of $O_2$ at a rate of about 1.5 liters/min. was continued by using the aforesaid system for a long period of 4000 hours, no reduction in adsorption power of the adsorbents in the adsorption columns was observed.

What is claimed is:

1. In a continuous process for the production of high purity oxygen from air by an initial step comprising selectively removing from said air, moisture and carbon dioxide by adsorption and a subsequent step comprisiig selectively removing nitrogen from said air by adsorption, the improvement which comprises:
    (a) an adsorption step which comprises:
        (i) introducing air into the inlet of an adsorption column equipped with an inlet and an outlet, said column being packed with an adsorbent selective to retention of moisture and carbon dioxide as opposed to nitrogen and oxygen;
        (ii) passing the effluent of the carbon dioxide-moisture adsorption column to the inlet of a nitrogen selective to retention of nitrogen as opposed to oxygen;
        (iii) recovering high purity oxygen from the outlet of the nitrogen adsorption column, until the effluent oxygen contains an unacceptable level of nitrogen at which point there is performed;
    (b) a desorption step which comprises:
        (i) closing off the air supply and applying vacuum at a point before the introduction of air to the inlet of the moisture-carbon dioxide adsorption column, whereby the greater portion of the gases desorbed in the nitrogen adsorption column are sucked back through the moisture-carbon dioxide adsorption column at which point;
    (c) the vaculm is terminated and the flow of air is resumed.

2. A process accordingto claim 1 wherein:
    when the carbon dioxide or moisture level of the effluent from the carbon dioxide-moisture adsorption column reaches an unacceptable level, said column is heated while running air through said column until the carbon-dioxide-moisture level returns to an acceptable level.

3. A process according to claim 1 wherein after the desorption step is completed, substantially pure oxygen is fed back to the outlet of the carbon dioxide-moisture adsorption column until the pressure in both columns is substantially the same, at which point, the air flow is resumed.

4. A process according to claim 2 wherein:
    (a) when the carbon dioxide-moisture level of the effluent from the first adsorption column reaches an unacceptable level, the flow of air to said column is terminated and said flow is bypassed to the inlet of an auxiliary carbon dioxide-moisture adsorption column, the outlet of which is serially connected to the inlet of the nitrogen adsorption column during which time;

(b) the carbon dioxide-moisture adsorption column initially used is regenerated by heating;

(c) the auxiliary moisture-carbon dioxide adsorption column is employed until its effluent contains an unacceptable level of moisture and carbon dioxide;

(d) at which point it is closed off and the initially employed carbon dioxide-moisture column is re-employed.

5. The process according to claim 1 wherein the nitrogen adsorption column employs an adsorbent selected from the group consisting of Molecular Sieve 5 A. and 13×.

6. The process according to claim 1 wherein the adsorbent employed in the carbon dioxide-moisture adsorption column is selected from the group consisting of synthetic zeolites, alumina, and silica gel.

7. A process according to claim 1 wherein the adsorbent for both the carbon dioxide-moisture removal column and for the nitrogen adsorption column is an aluminosilicate comprising $SiO_2$, $Al_2O_3$ and $H_2O$, containing 1 to 10% by weight of alkaline and alkaline earth metal oxides and having the X-ray diffraction pattern disclosed in Table 2 or Table 3 of the specification, which material is subjected to grinding and dehydration treatment at 350 to 700° C.

8. A process according to claim 1 wherein the nitrogen adsorption column has an adsorptive capacity in relationship to the carbon dioxide-moisture adsorption column, such that the former column is regenerated more frequently than the latter column.

References Cited

UNITED STATES PATENTS

| | | | |
|---|---|---|---|
| 2,944,276 | 7/1960 | Skarstrom | 55—68 X |
| 2,992,037 | 7/1961 | Vasan et al. | 55—62 |
| 3,237,379 | 3/1966 | Kant et al. | 55—62 X |

REUBEN FRIEDMAN, Primary Examiner

U.S. Cl. X.R.

55—62, 68, 76